(12) United States Patent
Noe et al.

(10) Patent No.: US 7,412,208 B1
(45) Date of Patent: Aug. 12, 2008

(54) TRANSMISSION SYSTEM FOR TRANSMITTING RF SIGNALS, POWER AND CONTROL SIGNALS VIA RF COAXIAL CABLES

(75) Inventors: Terrence R. Noe, Sebastopol, CA (US); Leonard M. Weber, Bodega Bay, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 812 days.

(21) Appl. No.: 10/094,741

(22) Filed: Mar. 11, 2002

(51) Int. Cl.
*H04B 3/36* (2006.01)
*H04B 3/58* (2006.01)
*H04B 7/14* (2006.01)

(52) U.S. Cl. .................. 455/14; 370/533; 370/522; 370/496; 327/311; 327/551

(58) Field of Classification Search .................. 455/14; 370/535, 522, 496, 533; 327/311, 551–559
See application file for complete search history.

(56) References Cited

U.S. PATENT DOCUMENTS

| | | | | |
|---|---|---|---|---|
| 3,701,059 A | * | 10/1972 | Nyswander ................ 333/173 |
| 3,701,851 A | * | 10/1972 | Starrett ....................... 370/430 |
| 4,381,456 A | * | 4/1983 | Saito et al. ................... 307/40 |
| 4,597,077 A | * | 6/1986 | Nelson et al. ............... 370/352 |
| 4,763,076 A | * | 8/1988 | Arakawa et al. ............ 324/322 |
| 4,788,675 A | * | 11/1988 | Jones et al. ................. 370/487 |
| 5,263,021 A | * | 11/1993 | Ortel .......................... 370/487 |
| 5,321,849 A | * | 6/1994 | Lemson ................... 455/67.11 |
| 5,343,240 A | * | 8/1994 | Yu ............................ 348/14.01 |
| 5,543,713 A | * | 8/1996 | Arakawa et al. ............ 324/322 |
| 5,600,471 A | * | 2/1997 | Hirohashi et al. ........... 398/136 |
| 5,678,198 A | * | 10/1997 | Lemson ................... 455/67.11 |
| 5,781,422 A | * | 7/1998 | Lavin et al. .................. 363/37 |
| 5,818,846 A | * | 10/1998 | Mori et al. ................... 370/532 |
| 5,960,005 A | * | 9/1999 | Moteki et al. ............... 370/496 |
| 6,014,546 A | * | 1/2000 | Georges et al. ............... 725/79 |
| 6,377,665 B1 | * | 4/2002 | Willer ....................... 379/90.01 |
| 6,449,362 B1 | * | 9/2002 | Tennyson et al. ...... 379/413.02 |
| 6,593,803 B2 | * | 7/2003 | Yoshizawa ................. 327/553 |
| 6,697,611 B1 | * | 2/2004 | Franca-Neto ............... 455/296 |
| 6,958,607 B2 | * | 10/2005 | Vaughan et al. ............. 324/318 |
| 2002/0095690 A1 | * | 7/2002 | Berger et al. ................ 725/151 |
| 2003/0008629 A1 | * | 1/2003 | Tegeler et al. .............. 455/307 |
| 2005/0100178 A1 | * | 5/2005 | Rybicki et al. .............. 381/101 |

* cited by examiner

*Primary Examiner*—Quynh H Nguyen

(57) ABSTRACT

A transmission system for RF signals, power and control signals over RF coaxial cables is disclosed. A coaxial cable line interconnects two devices, such as an instrument and a remote coupler. A control signal (e.g., data bit) and RF signals are multiplexed onto the coaxial cable line using a bias network at each end of the coaxial cable. In certain embodiments, power is generated at the coupler based on the state of the control bits. Each coaxial cable carries one control bit on the center conductor of the cable. A table maps the states of the one or more control bits to the desired states in the remote coupler. The all-zeroes state for the control bits is disallowed, such that at any given time, at least one of the control lines is high (e.g., at +5V). A passive network at the coupler generates the power voltage for the coupler from the control bits. In further embodiments, a power supply filter is provided at the coupler to supply power to the coupler during transitions of the passive network.

13 Claims, 3 Drawing Sheets

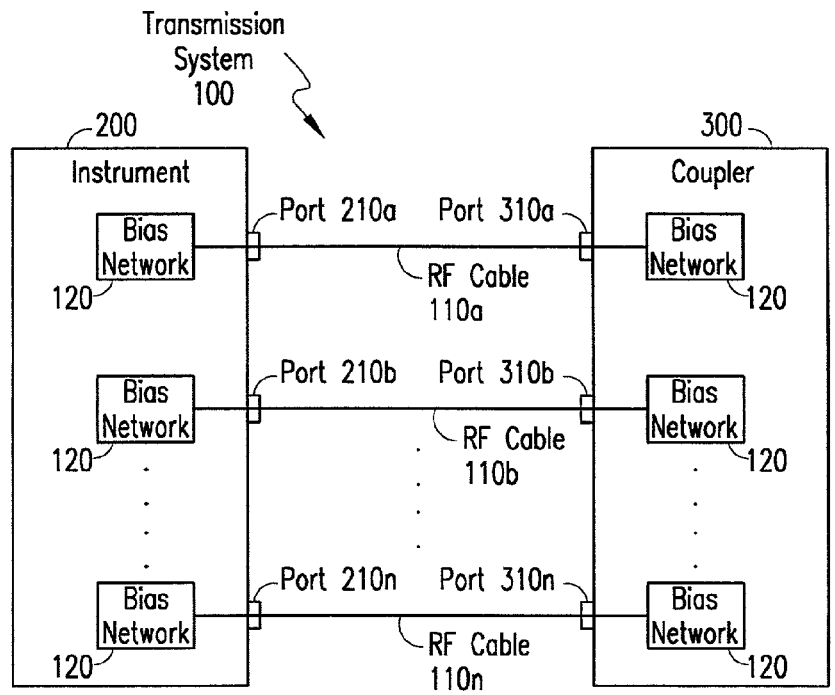
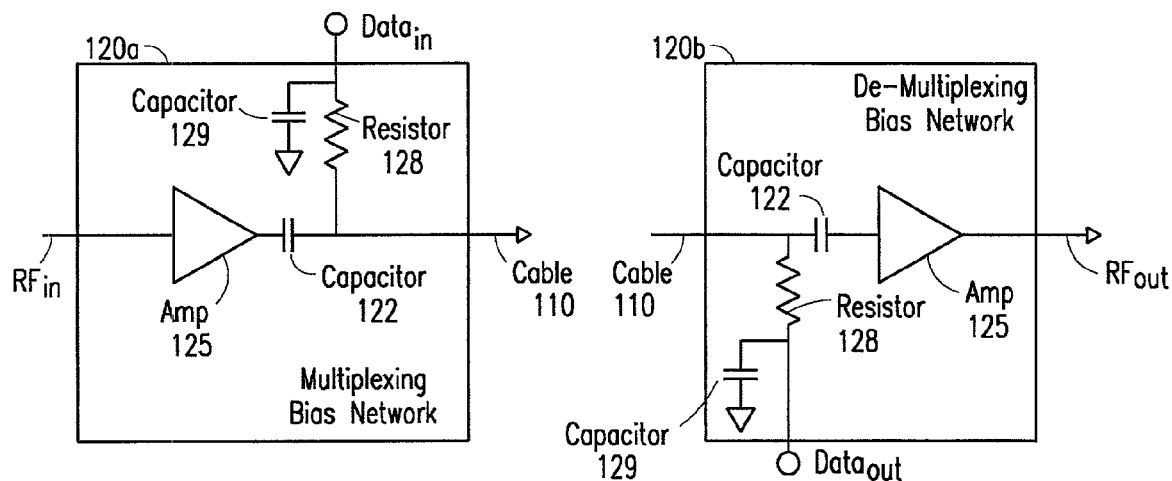
FIG. 1
FIG. 2
FIG. 3

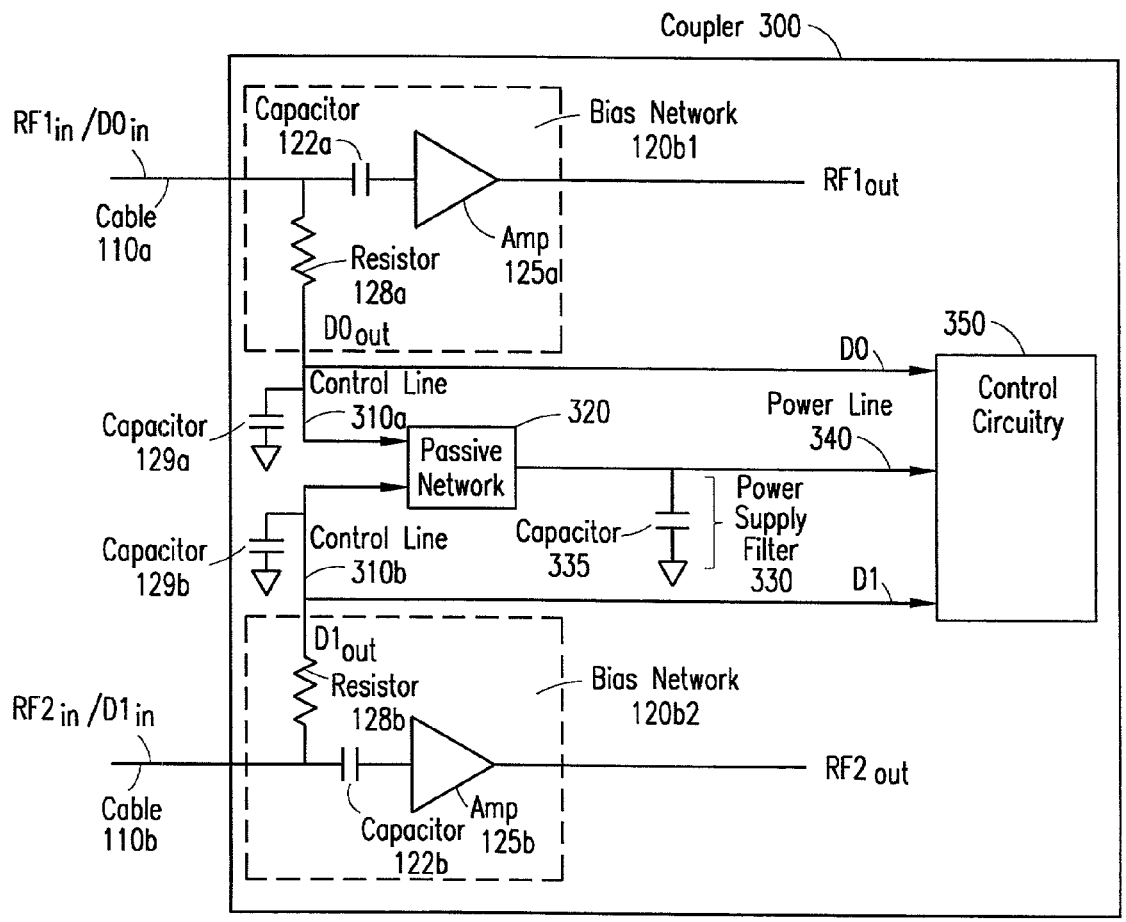
*FIG. 4*
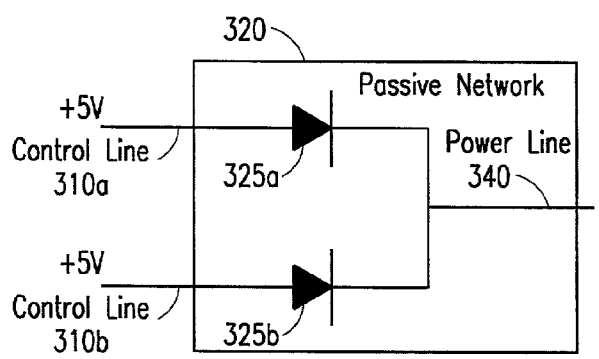
*FIG. 5*  *FIG. 6*

TRANSMISSION SYSTEM FOR TRANSMITTING RF SIGNALS, POWER AND CONTROL SIGNALS VIA RF COAXIAL CABLES

BACKGROUND OF THE INVENTION

1. Technical Field of the Invention

The present invention relates generally to power and control transmission systems, and specifically to, power and control transmission over RF coaxial cables.

2. Description of Related Art

Network analyzers and other types of measuring instruments are used to measure the magnitude and/or phase of a signal present in a device-under-test (DUT). For example, network analyzers can be used to determine the impedance, gain, group delay, gain compression and other characteristics of mobile telecommunications devices, such as base station antennas, amplifiers, cables and attenuators.

To perform a measurement, the instrument is connected to the DUT via one or more couplers that are strategically placed on one or more feeder cables of the DUT. To interface with the DUT, the instrument supplies RF signals, power and control signals to the coupler(s). For example, when using a network analyzer to measure the antenna return loss of a base station antenna, the RF signals can correspond to a swept signal injected into the feeder cable of a base station antenna. If there are any discontinuities in the feeder cable or antenna, part of the signal may be reflected back down the feeder cable to the network analyzer via the coupler. The control signals from the network analyzer control the RF switches in the coupler. For example, the coupler can be programmed to couple forward power, reverse power or calibration path signals to/from the network analyzer depending upon the states (on/off) of the RF switches in the coupler.

Traditionally, each coupler had separate ports for RF signals (injected signal and reflected signal), power and control signals. Likewise, the instrument also had separate ports for each coupler for the RF signals, power and control signals. The RF signal ports of the instrument and coupler were connected together via coaxial cables, while the power and control ports of the instrument and coupler were connected together via one or more multi-conductor cable assemblies. Depending upon the particular DUT, each of the cables used for connecting the instrument to the DUT could potentially be 40 feet long. Such cables are expensive and difficult to install (i.e., each cable may take up to 30 minutes to install). In addition, for outdoor installations, each cable represents a possible point of water ingress into the coupler.

In systems that require only RF signals and power (no control signals), such as high frequency microwave circuit systems, the RF and power signals can be multiplexed onto a single coaxial cable. The RF signals are transmitted over the RF cable and DC power is transmitted over the center conductor of the cable. A bias network on either side of the coaxial cable separates the RF and power signals. For example, a bias network can include a capacitor to block DC power and an inductor to block the RF signals.

However, in systems that require RF signals, power and control signals, there is currently no mechanism for multiplexing the control signals with the power or the RF signals. Therefore, what is needed is a transmission system for RF signals, power and control signals with a reduced amount of cabling.

SUMMARY OF THE INVENTION

The present invention provides a transmission system for RF signals, power and control signals over RF coaxial cables. A coaxial cable line interconnects a first device with a second device. A control signal (e.g., data bit) and RF signals are multiplexed onto the coaxial cable line using a bias network at each end of the coaxial cable.

In certain embodiments, power is generated at the second device (e.g., a remote coupler) based on the state of the control bits generated at the first device (e.g., instrument). Each coaxial cable carries one control bit on the center conductor of the cable. A table maps the states of the one or more control bits to the desired states in the remote coupler. The all-zeroes state for the control bits is disallowed, such that at any given time, at least one of the control lines is high (e.g., at +5V). A passive network at the coupler generates the power supply voltage for the coupler from the control bits. In further embodiments, a power supply filter is provided at the coupler to supply power to the coupler during transitions of the passive network.

Advantageously, multiplexing RF signals with control signals over RF coaxial cable lines enables power to be supplied to the coupler without dedicating a separate cable for power. Therefore, the number of cables required for interfacing the instrument to the coupler is reduced. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1 is a block diagram of an exemplary transmission system for interfacing an instrument with a remote coupler including one or more RF coaxial cables for transmitting both RF signals and control signals in accordance with embodiments of the present invention;

FIG. 2 is a circuit schematic of a bias network for multiplexing the RF signals and control signals onto one of the coaxial cables shown in FIG. 1;

FIG. 3 is a circuit schematic of a bias network for de-multiplexing the RF signals and control signals from one of the coaxial cables shown in FIG. 1;

FIG. 4 is a block diagram of an exemplary implementation of the transmission system in accordance with embodiments of the present invention;

FIG. 5 is an exemplary table for determining the state of control circuitry within the coupler shown in FIG. 4;

FIG. 6 is an exemplary circuit schematic of a passive network for providing power to the control circuitry within the coupler shown in FIG. 4.

DETAILED DESCRIPTION OF THE EXEMPLARY EMBODIMENTS OF THE INVENTION

Figure 7:
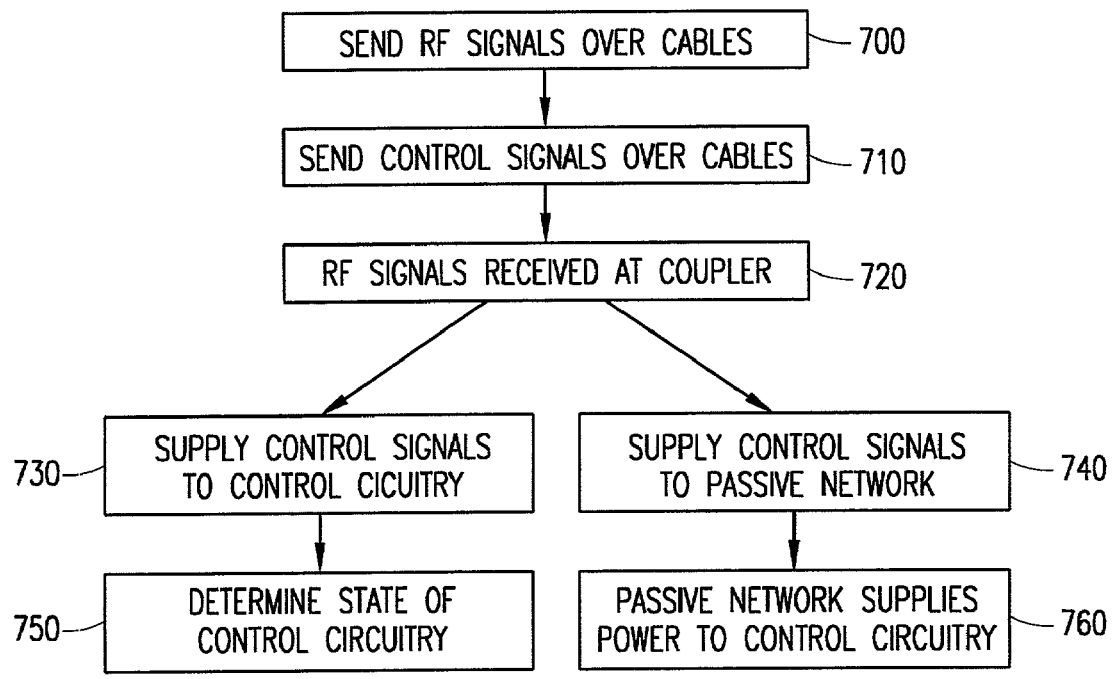
FIG. 7 is a flowchart illustrating exemplary steps for providing power to the coupler by multiplexing the RF signals with the control signals onto one or more coaxial cable lines.

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Referring now to FIG. 1, a transmission system 100 is illustrated for providing RF signals, power and control signals over RF coaxial cables 110. Each coaxial cable line 110 interconnects an instrument 200 with a remote coupler 300 and provides RF signals there between. Each coupler 300 has separate ports 310a, 310b . . . 310n for each of the RF signals (e.g., injected signal and reflected signal) that the coupler 300 transmits or receives. The number of ports 310 varies depending upon the particular implementation of the coupler 300. Likewise, the instrument 200 also has separate ports 210a, 210b . . . 210n for each of the RF signals. In addition, if the instrument 200 is capable of connecting to multiple couplers 300 simultaneously, the instrument has additional ports (not shown) for each of the couplers 300. The RF signal ports 210a, 210b . . . 210n and 3110a, 310b . . . 310n of the instrument 200 and coupler 300, respectively, are connected together via separate coaxial cables 110a, 110b, . . . 110n. Although the transmission system 100 of the present invention is illustrated in connection with an instrument 200 and a coupler 300, it should be understood that the transmission system 100 described herein can be applied to any two devices interconnected via coaxial cables 110, where one device provides RF signals and control signals to the other device.

A control signal (e.g., a data bit) and RF signals are multiplexed onto one of the coaxial cable lines 110 using a bias network 120 at each end of the cable 110. The bias network 120 can be any type of circuitry capable of multiplexing/de-multiplexing data with RF signals. As an example, FIG. 2 illustrates one type of bias network 120a capable of multiplexing data with RF signals. The multiplexing bias network 120a takes as input the RF signals ($RF_{in}$) and data bit ($Data_{in}$). The $RF_{in}$ is amplified by an amplifier 125 and passes through a capacitor 122 onto the RF cable 110. The $Data_{in}$ passes through a resistor 128 and is transmitted over the center conductor of the cable 110. The capacitor 122 isolates the $Data_{in}$ signal from the $RF_{in}$ signal, while the resistor 128 and capacitor 129 together form a low pass filter to isolate the $RF_{in}$ signal from the $Data_{in}$ signal.

FIG. 3 illustrates an example of a bias network 120b capable of de-multiplexing the control signal and the RF signals. The de-multiplexing bias network 120b receives the multiplexed $RF_{in}$ signal and $Data_{in}$ signal over the RF coaxial cable 110 and separates the $RF_{in}$ signal and $Data_{in}$ signal. The $RF_{in}$ signal passes through the capacitor 122 to the amplifier 125, where the signal is amplified and output ($RF_{out}$). The $Data_{in}$ signal passes through the resistor 128 to provide the control signal ($Data_{out}$) to the coupler. The low pass filter (i.e., resistor 128 in combination with capacitor 129) isolates the $RF_{in}$ signal from the $Data_{in}$ signal, while the capacitor 122 isolates the $Data_{in}$ signal from the $RF_{in}$ signal. It should be understood that in other embodiments, the amplifier 125 can be removed or replaced with other RF circuitry, such as switches and attenuators.

An exemplary implementation of the transmission system of the present invention is illustrated in FIG. 4. Specifically, an exemplary implementation of the coupler 300 side of the transmission system is shown in detail in FIG. 4. Instead of transmitting power to the coupler 300 from the instrument (not shown) over separate cables, power is generated at the coupler 300 based on the state of the control bits multiplexed with the RF signals onto the RF coaxial cables 110. Each coaxial cable 110a and 110b carries one control bit on the center conductor of the cable 110a and 110b. The bias networks 120b1 and 120b2 at the end of the coaxial cables 110a and 110b at the coupler 300 de-multiplex the RF signals from the control bits. For example, as shown in FIG. 4, a first coaxial cable 110a supplies $RF1_{in}/D0_{in}$ and a second coaxial cable 110b supplies $RF2_{in}/D1_{in}$. A first bias network 120b1 receives $RF1_{in}/D0_{in}$, provides $RF1_{in}$ to an amplifier 125a via a capacitor 122a to supply $RF1_{out}$ to the coupler 300 and provides $D0_{in}$ to a resistor 128a and capacitor 129a to supply $D0_{out}$ to the coupler 300. A second bias network 120b2 receives $RF2_{in}/D1_{in}$, provides $RF2_{in}$ to an amplifier 125b via a capacitor 122b to supply $RF2_{out}$ to the coupler 300 and provides $D1_{in}$ to a resistor 128b and capacitor 129b to supply $D1_{out}$ to the coupler 300. As discussed above in connection with FIG. 3, in other embodiments, the amplifiers 125a and 125b can be removed or replaced with other RF circuitry.

The two control bits D0 and D1 are received at control circuitry 350 within the coupler 300. For example, the control circuitry 350 can include one or more RF switches in the coupler 300, and the control bits D0 and D1 can control the states of the RF switches. As an example, the coupler 300 can be programmed to couple forward power, reverse power or calibration path signals to/from the instrument depending upon the states (on/off) of the RF switches in the coupler 300. The two control bits D0 and D1 are also received at a passive network 320 at the coupler 300 over respective control lines 310a and 310b. The passive network 320 generates the power supply voltage to the control circuitry 350 of the coupler 300 from the control bits D0 and D1.

Each control bit D0 and D1 is either in an "on" or "off" state, i.e., the control line 310a and 310b is either at 0 Volts or +5 Volts, corresponding to a "0" or "1" bit. When either one or both of the control bits D0 and D1 is at "1" (i.e., one or both of the control lines 310a and 310b is high), +5 Volts is received at the passive network 320 over the control line 310a and/or 310b and provided to the control circuitry 350 over a power line 340 as the power supply voltage. During transitions of the passive network 320 from D0 high to D1 high or vice-versa, power supply filter 330 that is connected to the power line 340 supplies power to the control circuitry 350 of the coupler 300. For example, the power supply filter 330 can include a grounded capacitor 335 that is charged up to +5 Volts and discharges when no power is present on the power line 340. Although two control bits D0 and D1 are illustrated in FIG. 4, it should be understood that the present invention can be extended to account for any number of control bits that are needed to control the states of the control circuitry 350 within the coupler 300.

A table maps the states of the one or more control bits to the desired states of the control circuitry in the remote coupler. FIG. 5 is an exemplary table 400 for determining the state of control circuitry within the coupler shown in FIG. 4. In FIG. 5, the all-zeroes state for the control bits (i.e., both D0 and D1 410 and 420, respectively, are at 0 Volts simultaneously) is disallowed, such that at any given time, at least one of the control lines is high (i.e., at +5V). Therefore, at any given time, power is able to be supplied to the control circuitry of the coupler. In the exemplary table, when D1 is high and D0 is low, the control circuitry state 450 is set to measure the forward power signal. In addition, when D0 is high and D1 is low, the control circuitry state 450 is set to measure the reverse power signal. Finally, when both D0 and D1 are high, the control circuitry state 450 is set to measure the calibration path signal.

FIG. 6 is an exemplary circuit schematic of a passive network 320 for providing power to the control circuitry within the coupler shown in FIG. 4. The two inputs to the passive network 320 are the D0 and D1 control bits. At any given time, either D0 or D1 is high, and therefore +5 Volts is received at the passive network 320 from one or both of the control lines 310*a* and/or 310*b*. Each control line 310*a* and 310*b* is connected to a respective forward-biased diode 325*a* and 325*b* that conducts charge upon the reception of input voltage. The outputs of the two diodes 325*a* and 325*b* are connected to the power line 340 to provide power to the control circuitry of the coupler. Although only two diodes 325*a* and 325*b* are shown, it should be understood that any number of diodes can be used depending upon the number of control bits needed by the control circuitry. In addition, it should be understood that any other type of switching device(s) capable of providing connectivity between the control lines 310*a* and 310*b* and the power line 340 can be used instead of diodes 325*a* and 325*b* discussed herein. Therefore, the power to the control circuitry can be represented as follows:

Power=D0 OR D1 OR . . . Dn, where n is the number of control bits supplied to the coupler from the instrument.

FIG. 7 is a flowchart illustrating exemplary steps for providing power to the coupler by multiplexing the RF signals with the control signals onto one or more coaxial cable lines. The instrument multiplexes the RF signals with the control signals onto one or more coaxial cable lines and sends the multiplexed RF signals and control signals to the coupler (steps 700 and 710). The coupler de-multiplexes the RF signals from the control signals (step 720), and supplies the control signals to the control circuitry (step 730) and to the passive network (step 740). The control signals are used by the control circuitry to determine the state of the control circuitry (e.g., whether the coupler should set the RF switches to look at forward power, reverse power or the calibration path) (step 750). The control signals are also used by the passive network to supply power to the control circuitry to enable the control circuitry to set the state of the coupler (step 760).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A transmission system for providing RF signals, power and control signals to a device, comprising:
   at least one bias network within the device, said at least one bias network being capable of being connected to at least one respective RF coaxial cable to receive respective multiplexed RF signals and controls signals, said at least one bias network being further capable of de-multiplexing the RF signals and control signals;
   at least one control line being connected to a respective one of said at least one bias network to receive a respective one of the de-multiplexed control signals;
   control circuitry within the device connected to said at least one control line to receive all of the de-multiplexed control signals, said control circuitry being configured to control the state of the device based on the states of the received de-multiplexed control signals; and
   a passive network within the device connected to said at least one control line to receive all of the de-multiplexed control signals and provide power to said control circuitry based on the state of each of the de-multiplexed control signals.

2. The system of claim 1, wherein said at least one bias network comprises a plurality of bias networks and said at least one RF coaxial cable comprises a plurality of RF coaxial cables, each of said plurality of bias networks being connected to a respective one of said plurality of RF coaxial cables.

3. The system of claim 1, wherein said passive network comprises at least one diode, each said at least one diode being connected to a respective one of said at least one control line.

4. The system of claim 1, further comprising;
   a power line interconnecting said passive network and said control circuitry to provide the power from said passive network to said control circuitry.

5. The system of claim 4, further comprising:
   a power supply filter connected to said power line to supply power to said control circuitry during transitions of said passive network.

6. The system of claim 1, further comprising:
   a table for mapping the states of the de-multiplexed control signals to the desired states of said control circuitry in the device, said table disallowing the all-zeroes state for all of the de-multiplexed control signals to enable the power to be supplied to said control circuitry of the device.

7. The system of claim 1, wherein said at least one bias network further comprises:
   a capacitor connected to pass the RF signals from the multiplexed RF signals and control signals;
   an amplifier connected to receive the de-multiplexed RF signals and amplify the de-multiplexed RF signals; and
   a low pass filter connected to pass the control signals from the multiplexed RF signals and control signals.

8. A method for providing RF signals, power and control signals from a first device to a second device, comprising:
   multiplexing the RF signals and control signals onto at least one RF coaxial cable interconnecting the first device and the second device;
   de-multiplexing the RF signals and control signals at the second device;
   controlling the state of the second device based on the states of the received de-multiplexed control signals; and
   providing a supply of power, from which the second device draws operating power, based on the state of each of the dc-multiplexed control signals.

9. The method of claim 8, wherein said step of multiplexing further comprises:
   multiplexing respective RF signals and control signals onto respective ones of a plurality of RF coaxial cables.

10. The method of claim 8, wherein said step of providing power further comprises:
    forward-biasing at least one diode based on the state of all of the de-multiplexed control signals to provide power to the second device.

11. The method of claim 8, wherein said step of providing power further comprises:
    supplying power to said control circuitry during transitions of the states of the de-multiplexed control signals.

12. The method of Clan 8, wherein said step of controlling further comprises:

mapping the states of the de-multiplexed control signals to the desired states of said control circuitry in the second device to control the state of the second device.

13. The method of claim 12, wherein said step of providing power further comprises:

disallowing the all-zeroes state for all of the de-multiplexed control signals to enable the power to be supplied to said control circuitry of the second device.

\* \* \* \* \*